United States Patent
Chung et al.

(10) Patent No.: US 10,236,703 B2
(45) Date of Patent: Mar. 19, 2019

(54) APPARATUS AND METHOD FOR CONTROLLING CHARGE AND DISCHARGE OF SECONDARY BATTERY

(71) Applicant: LG CHEM, LTD., Seoul (KR)

(72) Inventors: Dae-Sik Chung, Daejeon (KR);
Tae-Shin Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 845 days.

(21) Appl. No.: 14/593,143

(22) Filed: Jan. 9, 2015

(65) Prior Publication Data
US 2015/0115715 A1    Apr. 30, 2015

Related U.S. Application Data

(63) Continuation of application No. PCT/KR2013/010305, filed on Nov. 13, 2013.

(30) Foreign Application Priority Data

Nov. 13, 2012    (KR) .................. 10-2012-0128381

(51) Int. Cl.
*H02J 3/28*    (2006.01)
*H02J 3/38*    (2006.01)
(Continued)

(52) U.S. Cl.
CPC .............. *H02J 7/0068* (2013.01); *H02J 3/28* (2013.01); *H02J 3/382* (2013.01); *H02J 4/00* (2013.01);
(Continued)

(58) Field of Classification Search
CPC .. H02J 7/0068; H02J 3/28; H02J 3/382; H02J 4/00; H02J 7/007; Y10T 307/344; Y02E 70/30
See application file for complete search history.

(56) References Cited

U.S. PATENT DOCUMENTS 8,716,891 B2 * 5/2014 Choi .................. H02J 3/32
307/71
2009/0302681 A1    12/2009 Yamada et al.
(Continued)

FOREIGN PATENT DOCUMENTS

JP    H09-35757 A    2/1997
JP    2000-009021 A    1/2000
(Continued)

OTHER PUBLICATIONS

International Search Report issued in PCT/KR2013/010305 dated Mar. 17, 2014.
(Continued)

*Primary Examiner* — Lincoln D Donovan
*Assistant Examiner* — Colleen J O Toole
(74) *Attorney, Agent, or Firm* — Birch, Stewart, Kolasch & Birch LLP (57) ABSTRACT

Disclosed is an apparatus and method for controlling charge and discharge of a secondary battery. The apparatus for controlling charge and discharge of the secondary battery includes the power control unit calculates an amount of discharging power of the secondary battery, and when voltage value of the secondary battery is less than a preset reference voltage value, outputs a compensation charge control signal to charge the secondary battery with an amount of charging power obtained by adding an amount of power compensation to the calculated amount of discharging power. According to the present disclosure, the problem of a charge amount of the secondary battery reducing gradually with increasing charge and discharge cycles of the secondary battery may be prevented by compensating for the charge amount of the secondary battery.

11 Claims, 7 Drawing Sheets

(51) Int. Cl.
*H02J 4/00* (2006.01)
*H02J 7/00* (2006.01)

(52) U.S. Cl.
CPC ............... *H02J 7/007* (2013.01); *Y02E 70/30* (2013.01); *Y10T 307/344* (2015.04)

(56) References Cited

U.S. PATENT DOCUMENTS

2012/0038312 A1  2/2012  Abe et al.
2012/0105014 A1  5/2012  Nakayama et al.

FOREIGN PATENT DOCUMENTS

| JP | 2008-048544 A | 2/2008 |
| JP | 2011-080811 A | 4/2011 |
| WO | WO 2011/108249 A1 | 9/2011 |
| WO | WO 2012/020575 A1 | 2/2012 |

OTHER PUBLICATIONS

Written Opinion of the International Searching Authority issued in PCT/KR2013/010305 dated Mar. 17, 2014.

\* cited by examiner

APPARATUS AND METHOD FOR CONTROLLING CHARGE AND DISCHARGE OF SECONDARY BATTERY

CROSS-REFERENCE TO RELATED APPLICATION

The present application is a continuation of International Application No. PCT/KR2013/010305 filed on Nov. 13, 2013, which claims priority to Korean Patent Application No. 10-2012-0128381 filed in the Republic of Korea on Nov. 13, 2012, the disclosures of which are incorporated herein by reference.

TECHNICAL FIELD

The present disclosure relates to an apparatus and method for controlling charge and discharge of a secondary battery, and more particularly, to an apparatus and method for controlling charge and discharge of a secondary battery for quality stability of power generated using new renewable energy.

BACKGROUND ART

It is not too much to say that the modern society is being maintained by a large amount of electrical energy. Lots of people breathe in pleasant air in buildings by the aid of a conditioning system, talk to one another in different places using mobile phones, and moves to desired places by subways. In the modern society, electricity is a main energy source being widely used in every field of life although its significance is not recognized like water and air.

A majority of electrical energy is obtained by power generation systems using fossil fuels. However, recently, due to the exhaustion of fossil fuels and environmental pollution, attention is being paid to power generation systems using new renewable energy that produce electrical energy without using fossil energy.

New renewable energy refers to energy existing in nature, such as sunlight, solar heat, wind, tides, waves, geothermal heat, and the like. Power generation systems using new renewable energy are gaining popularity in that they do not involve resource exhaustion and environmental pollution issues. Among the power generation systems using new renewable energy, a wind power generation system uses wind energy.

A wind power generation system is a system that generates power using a wind power generator connected to and operated by a windmill that rotates by the wind and runs the wind power generator by its rotating power after being installed in an area in which the wind blows at more than a predetermined strength. To generate power stably using the wind power generation system, the wind power generator is installed in an area in which the wind blows continuously over the year. Also, for uniform quality of power generated by wind, the wind power generator is preferably installed in an area in which the wind blows at a uniform strength so much that a change in wind strength is not too great.

However, because wind blow is a natural phenomenon, it is very difficult to find an area perfectly satisfying all the desired conditions. Particularly, as wind strength is not uniform, a rotation speed of a windmill constantly fluctuates. In response to this phenomenon, techniques for changing a blade angle of a windmill based on wind strength are used. When wind strength is too low, a blade angle is adjusted to increase an area of a windmill blade facing the wind. In contrast, when wind strength is too high, a blade angle is adjusted to reduce an area of a windmill blade facing the wind. However, the techniques for changing the blade angle are inadequate for a small change in wind strength. Accordingly, to maintain the quality of power, a secondary battery is used together.

Figure 1:
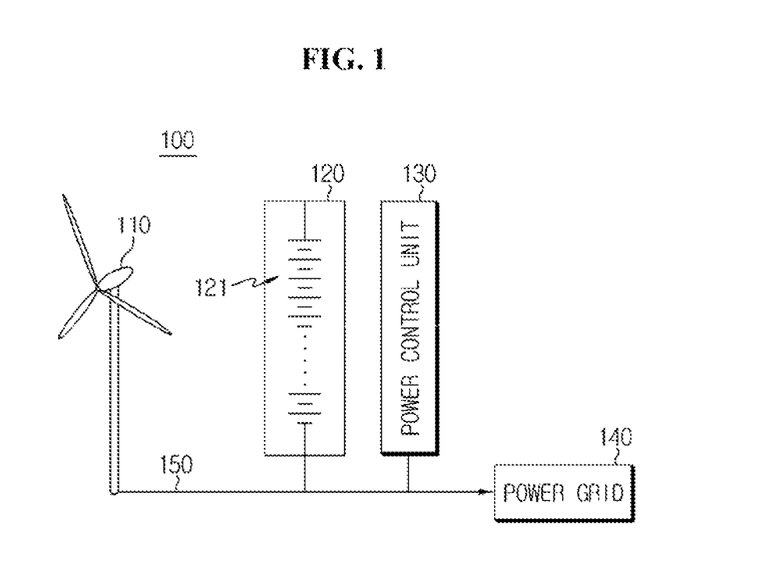
FIG. 1 is a block diagram schematically illustrating a configuration of a wind power generation system according to a related art.

FIG. 1 is a block diagram schematically illustrating a configuration of a wind power generation system 100 according to a related art.

Referring to FIG. 1, the wind power generation system 100 includes a power generation unit 110, a power storage unit 120, and a power control unit 130. Also, the power generation unit 110, and the power storage unit 120, and the power control unit 130 are connected to one another through a power line 150. The power line 150 provides a channel for power transfer that may also be used as a path for conveying a control signal to run the wind power generation system 100. In FIG. 1, a schematic illustration is provided to depict the power generation unit 110, and the power storage unit 120, and the power control unit 130 electrically connected to one another.

The wind power generation system 100 is a system that generates power using wind energy, one form of new renewable energy, and supplies the generated power to a power grid 140. The power grid 140 may be a commercial power grid or a small-scale local power grid. Also, according to circumstances, the power grid 140 may be a power storage device that stores power within a smart grid, a load that consumes generated power in an instant, or a power conversion device.

The power generation unit 110 serves to convert wind energy into electrical energy. For this, the power generation unit 110 includes a windmill that rotates by the wind, and a power generator operable to generate power by the rotating power of the windmill. Since principles of wind power generation are widely known to a person having ordinary skill in the art to which the present disclosure pertains, hereinafter referred to as a skilled person, a detailed description of specific construction is omitted herein.

The power storage unit 120 stores a certain amount of power generated by the power generation unit 110 by a control signal of the power control unit 130, or discharges a certain amount of stored power by a control signal of the power control unit 130. For this, the power storage unit 120 includes a secondary battery 121 capable of storing and discharging power.

In the supply of power generated by the wind power generation system 100 to the power grid 140, the power control unit 130 controls an amount of power supplied to the power grid 140 for quality stabilization of power. The term "quality stabilization of power" as used herein represents maintenance of a power factor required by the wind power generation system 100, for example, voltage and current of power supplied from the wind power generation system 100, and in the case of alternating current output, a frequency and a phase.

As described in the foregoing, because wind blow is a natural phenomenon, wind strength may be ununiform. Thus, a rotation speed of the windmill constantly fluctuates. The rotation speed of the windmill directly affects a rotation speed of the generator, and the rotation speed of the generator is directly related to the quality of output power. Basically, the quality of output power is stabilized by changing a blade angle of the windmill based on the wind strength, but in the case of a small change in wind strength, the quality of output power is stabilized through the power storage unit 120.

Figure 2:
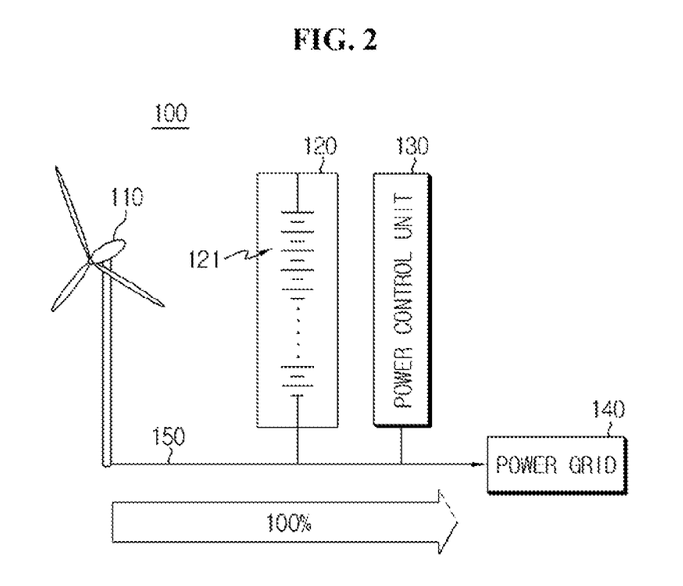
FIGS. 2 through 4 are conceptual diagrams illustrating quality stabilization of power.
Figure 3:
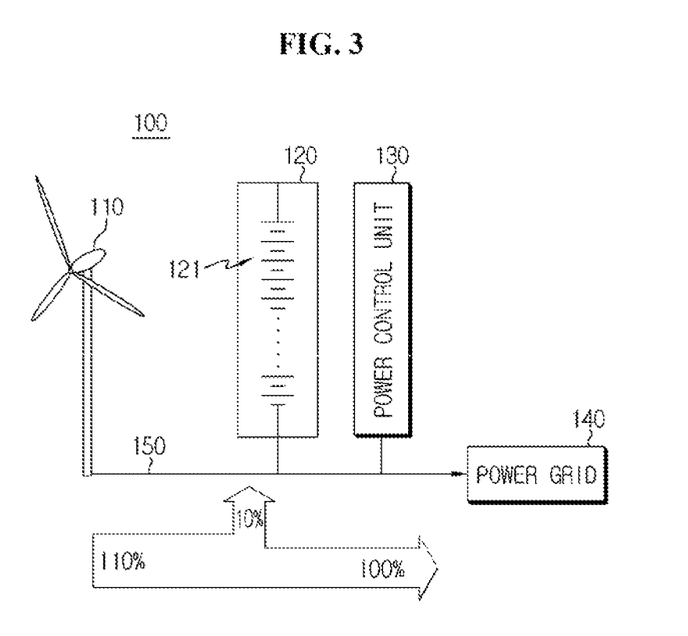
Figure 4:
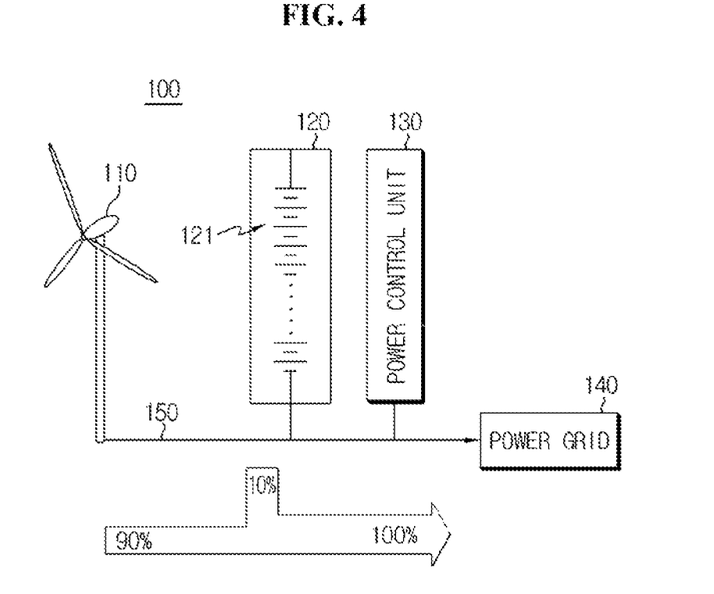

FIGS. 2 through 4 are conceptual diagrams illustrating quality stabilization of power.

First, referring to FIG. 2, an arrow indicated below the power line 150 denotes a concept of the supply of power generated by the power generation unit 110 to the power grid 140. Also, a figure indicated within the arrow denotes an amount of power generated by the power generation unit 110 being supplied to the power grid 140. In this instance, 100% represents that an amount of power generated by the power generation unit 110 completely satisfies an amount of power required by the power grid 140 or an amount of power scheduled to be generated by the power generation unit 110. Accordingly, in case the power generation unit 110 generates power in a full amount of power required or scheduled, there is no need for the power storage unit 120 to perform charging or discharging.

Next, referring to FIG. 3, a case in which an amount of power generated by the power generation unit 110 is larger than an amount of power required or scheduled by the power grid 140 is illustrated. When seeing FIG. 3 in comparison to FIG. 2, the power generation unit 110 generates power by 110% of the amount of power required or scheduled by the power grid 140. In this case, the power control unit 130 outputs a charge control signal to store an amount of power in excess (10%) in the power storage unit 120. Thereby, an amount of power supplied to the power grid 140 meets 100%.

Next, referring to FIG. 4, a case in which an amount of power generated by the power generation unit 110 is less than an amount of power required or scheduled by the power grid 140 is illustrated. When seeing FIG. 4 in comparison to FIG. 2, the power generation unit 110 generates power by 90% of the amount of power required or scheduled by the power grid 140. In this case, the power control unit 130 outputs a discharge control signal to discharge an amount of power in short supply (10%) from the power storage unit 120. Thereby, an amount of power supplied to the power grid 140 meets 100%.

As described in the foregoing, when an amount of power generated by the power generation unit 110 is larger than an amount of power required or scheduled, the power control unit 130 stores, in the power storage unit 120, an amount of power in excess among the amount of power generated by the power generation unit 110. In contrast, when an amount of power generated by the power generation unit 110 is less than an amount of power required or scheduled, the power control unit 130 discharges, from the power storage unit 120, an amount of power in short supply among the amount of power generated by the power generation unit 110. In this way, the power control unit 130 stabilizes the quality of power supplied to the power grid 140.

Although the wind power generation system 100 was described as an example among power generation systems that generate power using new renewable energy, other types of power generation systems also use the secondary battery 121 to improve the quality of power.

Meanwhile, the secondary battery 121 has an upper limit at which the secondary battery 121 can be physically charged and a lower limit at which the secondary battery 121 can be physically discharged. However, in an actual usage environment, the secondary battery 121 is not charged and discharged to the physical upper and lower limits. That is, a lower limit of a use area is set to be higher than a physical discharge limit point, and an upper limit of a use area is set to be lower than a physical charge limit point. Accordingly, when a state of the secondary battery 121 reaches the set lower limit of the use area during discharging of the secondary battery 121, the secondary battery 121 is said to be fully discharged. Also, when a state of the secondary battery 121 reaches the set upper limit of the use area during charging of the secondary battery 121, the secondary battery 121 is said to be fully charged. For example, the use area of the general lithium secondary battery 121 is set based on voltage, and has a voltage interval from 3.7V to 4.2V.

However, it is preferred that the secondary battery 121 included in the power storage unit 120 maintains a constant charge amount within the range between full charge and full discharge. This is because it is difficult to predict when an amount of power generated by the power generation unit 110 will fall short or go over. Accordingly, the power control unit 130 controls a charge amount of the secondary battery 121 to maintain at a constant amount to allow for both charging and discharging by the power storage unit 120. That is, there is a need to research into an apparatus and method for controlling charge and discharge to maintain a charge amount of the secondary battery 121 to prevent the secondary battery 121 from being fully discharged.

DISCLOSURE

Technical Problem

The present disclosure is designed to solve the problems of the related art, and therefore, the present disclosure is directed to providing an apparatus and method for controlling charge and discharge of a secondary battery to maintain a charge amount of the secondary battery.

Technical Solution

To achieve the above object, an apparatus for controlling charge and discharge of a secondary battery according to the present disclosure includes a sensing unit to measure voltage and current of the secondary battery and output a voltage value and a current value, the secondary battery being included in a power storage unit operable to store a certain amount of power generated by a power generation unit including a generator configured to generate power by new renewal energy, or to discharge stored power, and a power control unit to output a charge control signal to store the certain amount of power generated by the power generation unit in the power storage unit and supply residual power to an power grid, or to output a discharge control signal to discharge the power stored in the power storage unit and supply the same to the power grid together with the power generated by the power generation unit, wherein the power control unit calculates an amount of discharging power of the secondary battery using the voltage value or the current value measured by the sensing unit during discharging of the secondary battery, and when the voltage value of the secondary battery is less than a preset reference voltage value, outputs a compensation charge control signal to charge the secondary battery with an amount of charging power obtained by adding an amount of power compensation to the calculated amount of discharging power.

According to embodiments of the present disclosure, the power generation unit may generate power by at least one power generation method selected from sunlight power generation, solar heat power generation, wind power generation, geothermal heat power generation, hydroelectric power generation, tidal power generation, wave power generation, and power generation by ocean temperature difference.

The apparatus for controlling charge and discharge of the secondary battery according to the present disclosure further includes a rotations per minute (RPM) measuring device to measure a rotation rate of the generator included in the power generation unit and output a generator rotation rate value, and the power control unit determines the amount of power compensation based on an expected power generation amount of the power generation unit calculated using the generator rotation rate value.

According to one embodiment of the present disclosure, the amount of power compensation is calculated by the power control unit based on a preset ratio to the calculated expected power generation amount. Also, the preset ratio may increase with increasing number of charge and discharge cycles of the secondary battery.

According to another embodiment of the present disclosure, the amount of power compensation is preset based on the calculated expected power generation amount. Also, the preset amount of power compensation may increase with increasing number of charge and discharge cycles of the secondary battery.

The apparatus for controlling charge and discharge of the secondary battery according to the present disclosure further includes a power measuring device to measure an amount of power generated by the power generation unit and output a power generation amount value, and the power control unit determines the amount of power compensation based on the power generation amount value.

According to one embodiment of the present disclosure, the amount of power compensation is calculated by the power control unit based on a preset ratio to the power generation amount value. Also, the preset ratio may increase with increasing number of charge and discharge cycles of the secondary battery.

According to another embodiment of the present disclosure, the amount of power compensation is preset based on the power generation amount value. Also, the preset amount of power compensation may increase with increasing number of charge and discharge cycles of the secondary battery.

In the apparatus for controlling charge and discharge of the secondary battery according to the present disclosure, the amount of power compensation may be calculated by the power control unit based on a preset ratio to the calculated amount of discharging power. In this instance, the preset ratio may increase with increasing number of charge and discharge cycles of the secondary battery.

In the apparatus for controlling charge and discharge of the secondary battery according to the present disclosure, the amount of power compensation may be preset based on the calculated amount of discharging power. In this instance, the preset amount of power compensation may increase with increasing number of charge and discharge cycles of the secondary battery.

The apparatus for controlling charge and discharge of the secondary battery according to the present disclosure may further include a memory unit to store the reference voltage value.

The apparatus for controlling charge and discharge of the secondary battery according to the present disclosure may be one component of a new renewable energy generation system comprising a power generation unit including a generator configured to generate power by new renewal energy, and a power storage unit to store a certain amount of power generated by the power generation unit or discharge stored power. The new renewable energy generation system may further include a power conversion unit to convert the power generated by the power generation unit or the power outputted from the power storage unit to a required voltage value, a required current value, a required frequency, or a required waveform.

To achieve the above object, a method of controlling charge and discharge of a secondary battery according to the present disclosure that controls charge and discharge of a secondary battery for quality stabilization of power in the supply of power generated by new renewal energy to a power grid, the secondary battery being included in a power storage unit operable to store a certain amount of power generated by a power generation unit or discharge stored power, the method including (a) calculating an amount of discharging power of the secondary battery using a voltage value or a current value of the secondary battery received during discharging of the secondary battery, and (b) outputting a compensation charge control signal to charge the secondary battery with an amount of charging power obtained by adding an amount of power compensation to the calculated amount of discharging power, when the received voltage value of the secondary battery is less than a preset reference voltage value.

Advantageous Effects

According to an aspect of the present disclosure, the problem of a charge amount of a secondary battery reducing with increasing charge and discharge cycles of the secondary battery may be prevented by compensating for the charge amount of the secondary battery.

According to another aspect of the present disclosure, in the operation of the secondary battery, efficient charge control of the secondary battery may be achieved by compensating for a charge amount each time a voltage value of the secondary battery reaches a reference voltage value, instead of inefficiently operating the secondary battery by stopping the use of the secondary battery and compensating for a charge amount when the secondary battery is fully discharged.

According to still another aspect of the present disclosure, a state of charge of the secondary battery may be maintained to an optimum state according to the characteristics of a power generation system, and a degradation rate of the secondary battery may be slowed down.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawings.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 5:
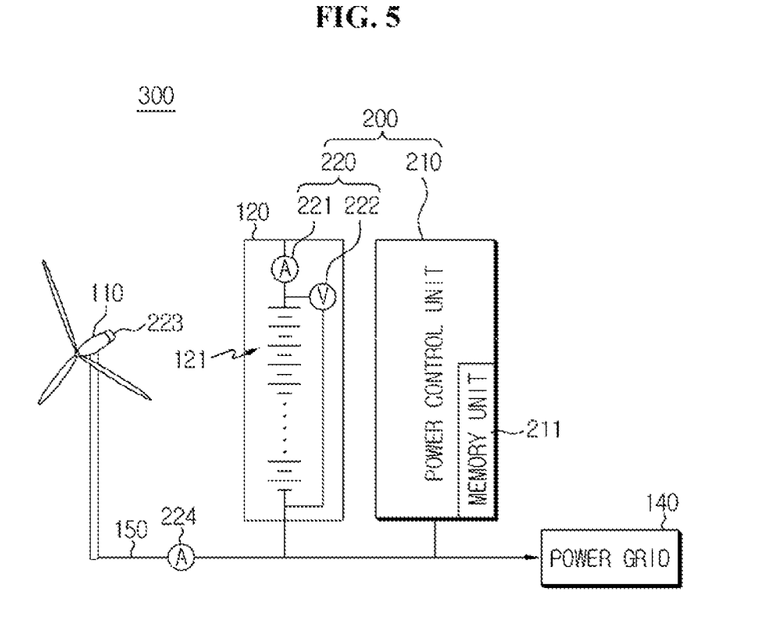
FIG. 5 is a block diagram schematically illustrating a configuration of a wind power generation system including an apparatus for controlling charge and discharge of a secondary battery according to an exemplary embodiment of the present disclosure.

FIG. 5 is a block diagram schematically illustrating a configuration of a wind power generation system 300 including an apparatus 200 for controlling charge and discharge of a secondary battery according to an exemplary embodiment of the present disclosure.

The apparatus 200 for controlling charge and discharge of the secondary battery according to the present disclosure, hereinafter referred to as the control apparatus 200, may be included in a power generation system that generates power using new renewable energy. The power generation system using new renewable energy is a power generation system that generates power by at least one power generation method selected from sunlight power generation, solar heat power generation, wind power generation, geothermal heat power generation, hydroelectric power generation, tidal power generation; wave power generation, and power generation by ocean temperature difference. However, for the convenience of description, the present disclosure will be described, citing the wind power generation system 300 using wind power among new renewable energy as an example. Accordingly, it should be understood that the present disclosure is not limited by the method of the power generation system.

Referring to FIG. 5, the wind power generation system 300 includes the power generation unit 110, the power storage unit 120, a power control unit 210, and the power line 150. Among the elements shown in FIG. 5, elements having the same reference numerals as the elements of FIG. 1 take the same roles. Accordingly, a description of the power generation unit 110, the power storage unit 120, the power line 150, the secondary battery 121, and the power grid 140 overlaps, and thus is omitted herein.

Also, the wind power generation system 300 may further include a power conversion unit to convert power generated by the power generation unit 110 or power outputted from the power storage unit 120 to a required voltage value, a required current value, a required frequency, or a required waveform. However, to avoid confusion when comparing FIG. 5 to FIG. 1, the power conversion unit is not illustrated.

The control apparatus 200 includes the power control unit 210 and a sensing unit 220. The sensing unit 220 measures voltage and current of the secondary battery 121 included in the power storage unit 120, and outputs a voltage value and a current value. For this, the sensing unit 220 may include a voltage measurement device 222 to measure voltage of the secondary battery and a current measurement device 221 to measure current of the secondary battery. The voltage value of the secondary battery represents an output voltage of the secondary battery 121, and may be measured during charging or discharging of the secondary battery 121, but may be measured as an open circuit voltage (OCV) while the secondary battery is not charged or discharged. Meanwhile, the current value of the secondary battery is measured during charging or discharging of the secondary battery 121.

The secondary battery 121 included in the power storage unit 120 includes at least one unit cell, and the cell is not limited to a specific type. The secondary battery is rechargeable and requires consideration of a charging or discharging voltage, and for example, includes a lithium ion battery, a lithium polymer battery, a Ni—Cd battery, a Ni—MH battery, a Ni—Zn battery, and the like. Also, a battery pack may be constructed by connecting a plurality of the secondary batteries 121 in series or parallel or in series/parallel. However, the present disclosure is not limited by a type, a number, an output voltage, and a charge capacity of the secondary battery 121.

The power control unit 210 basically outputs a signal for controlling the charge and discharge of the power storage unit 120 for quality stabilization of power. Since its detailed description is provided in the foregoing, a repeated description is omitted herein. Further, the power control unit 210 measures a state of charge or a charge amount of the secondary battery 121 using the voltage value and the current value of the secondary battery 121 received from the sensing unit 220. Also, the power control unit 210 outputs a compensation charge control signal to maintain the charge amount of the secondary battery 121 using the measured charge amount of the secondary battery 121.

To understand an algorithm of the power control unit 210 according to the present disclosure, first, let us see what happens to the secondary battery 121 included in the power storage unit 120 to stabilize the quality of power during repeated charging and discharging.

As described in the foregoing, for quality stabilization of power, it is preferred for the secondary battery 121 to maintain a constant voltage value between a full charging voltage and a full discharging voltage, that is, a constant charge amount. For this, the power control unit 210 measures a charge amount of the secondary battery 121 using the voltage value and the current value of the secondary battery received from the sensing unit 220.

In this instance, as an example of a technique for measuring and controlling a charge amount of the secondary battery 121, ampere counting is given. Ampere counting is a technique that accumulates charging and discharging current of the secondary battery 121 during charging and discharging of the secondary battery 121, and through this, calculates a state of charge (SOC). Specifically, based on a rated capacity of the secondary battery 121, a SOC value is calculated as a ratio of a currently remaining capacity to the rated capacity. When the calculated SOC is equal to a preset optimum charge amount, charging is stopped, and when the calculated SOC is less than the preset optimum charge amount, discharging is stopped.

Figure 6:
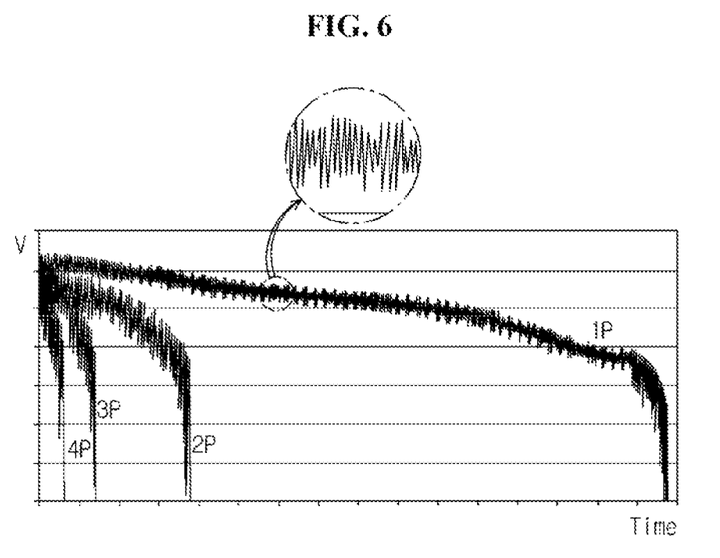
FIG. 6 is a graph detailing voltage profiles of a secondary battery in which a voltage drop phenomenon occurs when the secondary battery runs based on a traditional ampere counting algorithm.

However, a technique for controlling charge and discharge using SOC has a problem that an actual amount of charge stored in the secondary battery 121 becomes lower than a calculated charge amount with increasing number of charge and discharge cycles, due to a power loss caused by an internal resistance of the secondary battery 121 in combination with accumulation of a current measurement error occurring during ampere counting. That is, an original charge amount is not recovered even though a charging current is supplied to the secondary battery 121 as much as an accumulated amount of electric current counted when the secondary battery 121 is discharged. This phenomenon becomes severer as the number of charge and discharge cycles of the secondary battery 121 increases. This is because the secondary battery 121 degrades with increasing number of charge and discharge cycles of the secondary battery 121, and the internal resistance increases as much as an extent of degradation of the secondary battery 121. FIG. 6 is a graph detailing voltage profiles of the secondary battery 121 in which a voltage drop phenomenon occurs when the secondary battery 121 runs based on a traditional ampere counting algorithm.

Referring to FIG. 6, a horizontal axis of the graph represents time, and a vertical axis of the graph represents voltage of the secondary battery 121. Also, '1P, 2P, 3P, 4P' are indicated for each profile, and here, 'P' denotes 'P-rate'.

'P-rate' is a unit representing a discharge rate of the secondary battery 121. 'P-rate' is calculated by W/Wh whose a denominator is a total amount of power (Wh) and a numerator is a discharging power (W).

Generally, 'C-rate' representing a discharge rate of the secondary battery 121 is a discharge rate calculated based on current. 'C-rate' is calculated by mA/mAh whose a denominator is a total amount of current (mAh, an amount of electric charge) and a numerator is a discharging current (mA). However, discharging relies on not only current but also voltage, due to the electrical characteristics of the secondary battery 121. The power outputted from the secondary battery 121 may change by various factors, for example, a change of a load connected to the secondary battery 121 or a reduction in open voltage of the secondary battery 121 caused by a reduction in charge amount. Accordingly, when a discharge rate is determined based on 'P-rate' in which both current and voltage are taken into consideration, a state of the secondary battery 121 may not be determined in terms of current but in terms of energy stored in and drawn from the secondary battery 121.

A total of four profiles shown in FIG. 6 show a dynamic voltage of the secondary battery 121 when charging and discharging is repeatedly performed on the same secondary battery 121 at varying ratios of discharging power. 2P represents a voltage profile during discharging with a larger amount of power twice than that of 1P, 3P represents a voltage profile during discharging with a larger amount of power three times than that of 1P, and 4P represents a voltage profile during discharging with a larger amount of power four times than that of 1P. When power from the secondary battery 121 is supplied to a load, an amount of power supplied from the secondary battery 121 to the load is measured, summed up, and stored as an amount of discharging power. Also, the same amount of power as the amount of discharging power is provided and used to charge the secondary battery 121. Referring to an enlarged section of the 1P profile in FIG. 1, a period during which a dynamic voltage of the secondary battery 121 reduces corresponds to a discharging period of the secondary battery 121, and a period during which a dynamic voltage of the secondary battery 121 increases corresponds to a charging period of the secondary battery 121.

As demonstrated in FIG. 6, it can be seen that even though the secondary battery 121 is charged with the same amount of power as the amount of discharging power, the profiles of the dynamic voltage of the secondary battery 121 gradually drop as charging and discharging repeat. Meanwhile, voltage of the secondary battery 121 is an index indirectly indicating a charge amount of the secondary battery 121. Accordingly, a voltage drop phenomenon of the secondary battery 121 implies that an amount of charge stored in the secondary battery 121 gradually reduces even though the secondary battery 121 is charged with the same amount of power as the amount of discharging power as described in the foregoing. This phenomenon occurs at a voltage drop speed changing based on ratios of discharging power, but in the sense that after all, it occurs in the secondary battery 121, there is no difference.

In terms of energy of the secondary battery 121, let us see a voltage drop phenomenon of the secondary battery 121, that is, a phenomenon in which an amount of charge stored in the secondary battery 121 reduces due to repeated charging and discharging. Charging of the secondary battery 121 is said to be a process in which electrical energy is supplied to the secondary battery 121 and energy corresponding to a charge amount of the secondary battery 121 is stored in the secondary battery 121. Also, discharging of the secondary battery 121 is said to be a process in which energy stored in the secondary battery 121 is converted to electrical energy and supplied to the power grid 140. In the ideal secondary battery 121, there is no internal resistance affecting a charging/discharging process, but actually, the secondary battery 121 has an internal resistance. Accordingly, a loss occurs in the secondary battery 121 in the process of energy conversion, for example, heat generation through an internal resistance during discharging. However, measurement of an amount of discharging power does not involve measurement of an amount of energy loss. The measurement of discharging power corresponds to measurement of an amount of power transmitted from the secondary battery 121 to the power grid 140, that is, measurement of only an amount of electrically transmitted energy, and accordingly, a measured amount of discharging power may be smaller than an amount of energy actually drawn from the secondary battery 121. Therefore, if the secondary battery 121 is only charged with an amount of power corresponding to the measured amount of discharging power, the charge amount of the secondary battery 121 will gradually reduce.

Also, actually, the internal resistance of the secondary battery 121 affects a charging process as well as a discharging process. That is, the energy loss described in the foregoing occurs not only during discharging but also during charging. Some of the electrical energy supplied to the secondary battery 121 through power generation unit 110 is lost in the process of energy conversion, for example, heat generation by the internal resistance of the secondary battery 121. Also, only the rest is stored into energy in an amount corresponding to the charge amount of the secondary battery 121. Thus, even though an energy loss occurred during discharging is accurately measured and power is supplied to the secondary battery 121 in a corresponding amount, an actual amount of energy stored in the secondary battery 121 is smaller than an amount of supplied energy. Accordingly, as charging and discharging repeat, a charge amount of the secondary battery 121 will gradually reduce as much an amount of power lost in the charge of the secondary battery 121.

As described in the foregoing, an amount of discharging power measured during discharging is smaller than an amount of power (charge amount) drawn from the secondary battery 121. Also, even though the secondary battery 121 is charged with the same amount of power as the measured amount of discharging power, the amount of power (charge amount) stored in the secondary battery 121 is smaller than the amount of discharging power. That is, as charging/ discharging is performed repeatedly, the amount of charge stored in the secondary battery 121 gradually reduces. Also, a reduction in charge amount can be seen as a voltage drop phenomenon of the secondary battery 121.

Even in the case where the secondary battery 121 is charged with the same charge amount based on the measured amount of discharging power, a phenomenon in which an amount of charge stored in the secondary battery 121 reduces as described in the foregoing occurs, and such charge amount reduction phenomenon may occur more seriously in the secondary battery 121 used in the wind power generation system 300. That is, this is because charging/discharging is not performed regularly in the wind power generation system 300, but asymmetrically based on an amount of power generated by the power generation unit 110. Also, when a state of charge of the secondary battery 121 approaches full discharge, even though the power control unit 210 first charges the secondary battery 121 while reducing an amount of power supplied to the power grid 140, in the case where the secondary battery 121 is charged with the same charge amount based on the amount of discharging power, the charge amount of the secondary battery 121 will continue to reduce.

Therefore, the control apparatus 200 according to the present disclosure is a control apparatus that assesses the characteristics of the secondary battery 121 and compensates for a decrease in charge amount to enable the secondary battery 121 included in the power storage unit 120 to maintain a constant charge amount. Briefly describing an algorithm of the control apparatus 200 according to the present disclosure for solving the problem, the power control unit 210 according to the present disclosure controls to charge the secondary battery 121 with a larger amount of charging power than a measured amount of discharging power. Hereinafter, the algorithm of the power control unit 210 will be described in detail.

Meanwhile, the control apparatus 200 according to the present disclosure may further include a memory unit 211. The memory unit 211 according to the present disclosure corresponds to a high-capacity storage medium such as a semiconductor device or a hard disk that is known as being capable of recording and erasing data, for example, random access memory (RAM), read-only memory (ROM), electrical erasable programmable read-only memory (EEPROM), and the like, and encompasses any device capable of storing information regardless of a device type and is not limited to a specific memory device. With regard to a role of the memory unit 211, its detailed description will be provided below together with a function of the power control unit 210. Meanwhile, although this embodiment shows that the memory unit 211 is disposed inside the power control unit 210, the memory unit 211 may be disposed outside the power control unit 210.

The power control unit 210 calculates an amount of discharging power of the secondary battery 121 using the voltage value or the current value measured by the sensing unit 220 during discharging of the secondary battery 121. In this instance, the calculated amount of discharging power may be also stored in the memory unit 211. The amount of discharging power may be calculated by an ampere counting technique as described in the foregoing. However, the present disclosure is not limited to the method for calculating the amount of discharging power, and the amount of discharging power of the secondary battery 121 may be calculated by various methods for calculating the amount of discharging power well known to a skilled person.

The amount of discharging power may be an amount of discharging power calculated in the last discharging process among repeated charging and discharging of the secondary battery. Also, the amount of discharging power may be a residual amount of discharging power except for an amount of charging power calculated in the above charging process among repeated charging and discharging of the secondary battery 121.

The power control unit 210 determines whether the voltage value of the secondary battery outputted from the sensing unit 220 is less than a preset reference voltage value. For this, the preset reference voltage value may be stored in the memory unit 211. Also, the reference voltage value is a value that may be set or changed based on various characteristics of the secondary battery 121 such as a capacity, a usage environment, and the like.

When the voltage value of the secondary battery is less than the reference voltage value, the power control unit 210 determines an amount of power compensation. Also, the power control unit 210 outputs a 'compensation charge control signal' to charge the secondary battery 121 with an amount of charging power in which the amount of power compensation is added to the amount of discharging power stored in the memory 211. The compensation charge control signal is a control signal of a different nature from the above-mentioned charge control signal and discharge control signal for quality stabilization of power. The charge control signal and the discharge control signal for quality stabilization of power is a signal used to control the secondary battery 121 in response to determination as to whether to discharge or charge the secondary battery 121 based on the amount of power generated by the power generation unit 110 and the amount of power supplied to the power grid 140. However, the compensation charge control signal is a signal for controlling the charge amount of the secondary battery in consideration of the state of charge of the secondary battery 121. Thus, a total amount of power supplied to the power grid 140 may reduce in the middle of outputting the compensation charge control signal. Also, as described previously with reference to FIG. 6, as a charging/discharging process of the secondary battery 121 repeats, the charge amount gradually reduces. In this instance, a charge amount reduction phenomenon of the secondary battery 121 can be seen through a voltage drop phenomenon of the secondary battery 121. Accordingly, to compensate for a decrease in charge amount, the control apparatus 200 according to the present disclosure controls to charge the secondary battery 121 with a larger amount of power than the calculated amount of discharging power to compensate for the decreased charge amount. In this instance, an amount of added power is an amount of power compensation. Also, an amount of power obtained as a result of adding the amount of power compensation to the amount of discharging power is an amount of charging power.

According to one embodiment of the present disclosure, the power control unit 130 may calculate the amount of power compensation based on a preset ratio to the calculated amount of discharging power. The preset ratio may be stored in the memory unit 211, and the power control unit 210 may calculate the amount of power compensation by referring to the ratio stored in the memory unit 211. When the amount of power compensation is determined, the power control unit 210 outputs the compensation charge control signal to charge the secondary battery 121 with the amount of charging power in which the amount of power compensation is included. Meanwhile, the ratio for calculating the power compensation may be variously set in consideration of characteristics, a usage environment, and a voltage compensation value of the secondary battery.

Meanwhile, the ratio for calculating the amount of power compensation may increase with increasing number of charge/discharge cycles of the secondary battery 121. When the number of charge/discharge cycles of the secondary battery 121 increases, the secondary battery 121 gradually degrades. As an extent of degradation of the secondary battery 121 increases, an internal resistance of the secondary battery 121 rises. As the internal resistance of the secondary battery 121 rises, an energy loss in a charging/discharging process of the secondary battery increases. Accordingly, with the increasing energy loss, there is a need to increase the amount of power compensation. For this, the ratio for calculating the amount of power compensation may increase with increasing number of charge/discharge cycles of the secondary battery 121.

According to another embodiment of the present disclosure, the amount of power compensation may be preset based on the calculated amount of discharging power. Similarly, the preset amount of power compensation may be stored in the memory unit 211, and the power control unit 210 may refer to the amount of power compensation stored in the memory unit 211. Also, the power control unit 210 outputs the compensation charge control signal to charge the secondary battery with the amount of charging power in which the amount of power compensation is included. Meanwhile, the amount of power compensation may be variously set in consideration of characteristics, a usage environment, and a voltage compensation value of the secondary battery.

Meanwhile, the preset amount of power compensation may increase with increasing number of charge/discharge cycles of the secondary battery 121.

The ratio for calculating the amount of power compensation or the preset amount of power compensation increasing with increasing number of charge/discharge cycles of the secondary battery 121 may increase in inverse proportion in association with a state of health (SOH) of the secondary battery 121. As a method of calculating the SOH of the secondary battery 121, the power control unit 210 may calculate the SOH of the secondary battery 121 using the electrical characteristic value (for example, voltage, current) of the secondary battery 121 received through the sensing unit 220. Its detailed description is omitted herein because there are various known methods of calculating the SOH of the secondary battery 121 in the technical field to which the invention pertains. As the calculated SOH value is lower, that is, as the extent of degradation of the secondary battery 121 increases, the power control unit 210 controls to increase the amount of power compensation in inverse proportion to the calculated SOH.

The control apparatus 200 according to the present disclosure may calculate the amount of power compensation in consideration of the amount of power generated by the power generation unit 110. That is, the control apparatus 200 may determine whether the amount of power generated by the power generation unit 110 satisfies the amount of power required by the power grid 140 and is sufficient to charge the secondary battery 121, or whether to charge the secondary battery 121 by priority while reducing the amount of power supplied to the power grid 140.

For this, the control apparatus 200 according to the present disclosure may further include a rotations per minute (RPM) measuring device 223 to measure a rotation rate of the generator included in the power generation unit 110 and output a generator rotation rate value. In this instance, the power control unit 210 calculates an expected power generation amount of the power generation unit 110 using the generator rotation rate value received from the RPM measuring device 223.

According to one embodiment of the present disclosure, the power control unit 210 calculates the amount of power compensation based on a preset ratio to the calculated expected power generation amount. The preset ratio may be stored in the memory unit 211, and the power control unit 210 may calculate the amount of power compensation by referring to the ratio stored in the memory unit 211. Also, the power control unit 210 may output the compensation charge control signal based on the calculated amount of power compensation.

Meanwhile, the preset ratio may increase with increasing number of charge/discharge cycles of the secondary battery 121.

According to another embodiment of the present disclosure, the amount of power compensation may be preset based on the calculated expected power generation amount. The preset amount of power compensation may be stored in the memory unit 211, and the power control unit 210 may output the compensation charge control signal based on the amount of power compensation stored in the memory unit 211.

Meanwhile, the preset amount of power compensation may increase with increasing number of charge/discharge cycles of the secondary battery 121.

Meanwhile, the control apparatus 200 according to the present disclosure may further include a power amount measuring device 224 to measure an amount of power generated by the power generation unit 110 and output a power generation amount value.

According to one embodiment of the present disclosure, the power control unit 210 calculates the amount of power compensation based on a preset ratio to the measured power generation amount value. The preset ratio may be stored in the memory unit 211, and the power control unit 210 may calculate the amount of power compensation by referring to the ratio stored in the memory unit 211. Also, the power control unit 210 may output the compensation charge control signal based on the calculated amount of power compensation.

Meanwhile, the preset ratio may increase with increasing number of charge/discharge cycles of the secondary battery 121.

According to another embodiment of the present disclosure, the amount of power compensation may be preset based on the measured power generation amount. The preset amount of power compensation may be stored in the memory unit 211, and the power control unit 210 may output the compensation charge control signal based on the amount of power compensation stored in the memory unit 211.

Meanwhile, the preset amount of power compensation may increase with increasing number of charge/discharge cycles of the secondary battery 121.

The memory unit 211 stores a value based on a method of determining the amount of power compensation. In this instance, in the case where the amount of power compensation is calculated based on a ratio, a ratio value is stored, and in the case where the amount of power compensation is a preset value, a power compensation amount value is stored. Also, in the case where the amount of power compensation increases with increasing number of charge/discharge cycles of the secondary battery, the ratio value or the power compensation amount value based on the number of charge/discharge cycles of the secondary battery may be stored in a form of a lookup table.

To execute various control logics described in the foregoing, the power control unit 210 may include a processor, an application-specific integrated circuit (ASIC), other chipsets, a logic circuit, a register, a communication modem, a data processing device, and the like, known in the art pertaining to the present disclosure. Also, when the exemplary control logics are implemented as software, the power control unit 210 may be implemented as an assembly of program modules. In this instance, the program module may be stored in a memory and executed by a processor. Here, the memory may be inside or outside the processor, and connected to the processor by various well-known means. Also, the memory may be inside or outside the memory unit 211. The memory collectively refers to a device used to store information regardless of a device type, and is not limited to a specific memory device.

Hereinafter, a method of controlling charge and discharge of a secondary battery corresponding to an operating mechanism of the above-mentioned apparatus is disclosed. However, with regard to the components of the control apparatus 200 described previously, a repeated description is omitted herein.

Figure 7:
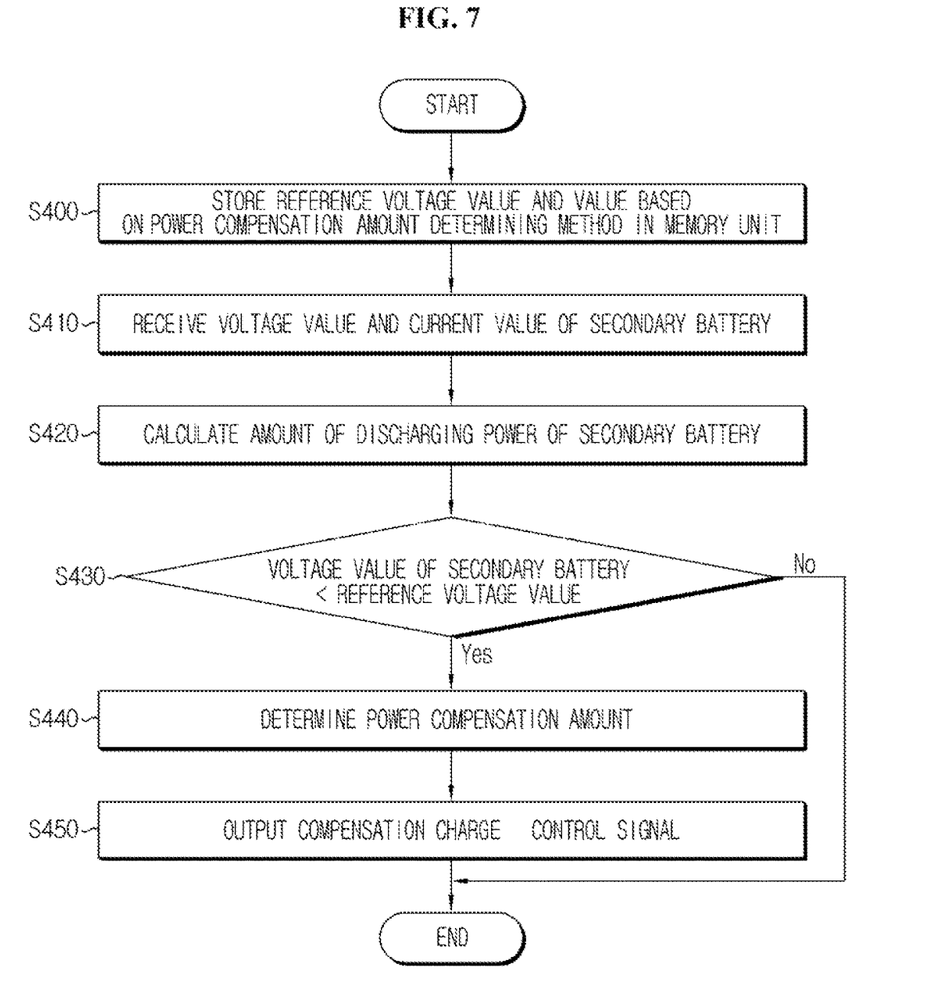
FIG. 7 is a flowchart chronologically illustrating a method for controlling charge and discharge of a secondary battery according to an exemplary embodiment of the present disclosure.

FIG. 7 is a flowchart chronologically illustrating a method for controlling charge and discharge of a secondary battery according to an exemplary embodiment of the present disclosure.

First, in S400, a reference voltage value and a value based on a power compensation amount determining method are stored in the memory unit 211. As described in the foregoing, in the case where an amount of power compensation is calculated using a ratio to an amount of discharging power, the value based on the power compensation amount determining method represents the ratio value, and in the case where an amount of power compensation is preset, the value based on the power compensation amount determining method represents the preset amount of power compensation. Also, as described in the foregoing, in the case where an amount of power compensation is calculated using a ratio to an expected power generation amount or a power generation amount value of the power generation unit 110, the value based on the power compensation amount determining method represents the ratio value, and in the case where an expected power generation amount or a power generation amount value of the power generation unit 110 is preset, the value based on the power compensation amount determining method represents the preset amount of power compensation.

Subsequently, in S410, the sensing unit 220 measures voltage and current of the secondary battery during charging and discharging of the secondary battery 121. Also, the sensing unit 220 outputs a signal corresponding to the measured voltage value and the measured current value to the side of the power control unit 210. Then, the power control unit 210 stores the received voltage value and the received current value of the secondary battery in the memory unit 211.

Subsequently, in S420, the power control unit 210 calculates an amount of discharging power of the secondary battery using the voltage value and current value stored in the memory unit 211. In this instance, the calculated amount of discharging power of the secondary battery may be stored in the memory unit 211.

Meanwhile, an embodiment of calculating the amount of discharging power of the secondary battery after receiving the voltage value and current value of the secondary battery is illustrated in the flowchart of FIG. 7. However, an embodiment in which the power control unit 210 calculates the amount of discharging power in real time during charging and discharging of the secondary battery may be contemplated, and it is obvious that this modification may be easily made by any skilled person.

Subsequently, in S430, the power control unit 210 determines whether the voltage value of the secondary battery is less than the reference voltage value. If the voltage value of the secondary battery is higher than the reference voltage value (No in S430), the power control unit 210 determines that there is no need to compensate for a charge amount. Accordingly, the process is terminated.

In contrast, if the voltage value of the secondary battery is less than the reference voltage value (YES in S430), the power control unit 210 determines that there is a need to compensate for a charge amount. Accordingly, the process goes to S440.

In S440, the power control unit 210 determines an amount of power compensation by the power compensation amount determining method. According to an exemplary embodiment of the present disclosure, in S440, an amount of power compensation may be determined by obtaining a preset amount of power compensation from the memory unit 211. Because a detailed description of the power compensation amount determining method was provided in the description of the control apparatus 200 according to the present disclosure, a repeated description is omitted herein.

When the amount of power compensation is determined in S440, in S450, the power control unit 210 determines an amount of charging power by adding the amount of power compensation to the amount of discharging power. Also, the power control unit outputs a compensation charge control signal to charge the secondary battery 121 with the amount of charging power.

According to the present disclosure, the problem of the charge amount of the secondary battery gradually reducing with increasing charge and discharge cycles of the secondary battery may be prevented by compensating for the charge amount of the secondary battery. Also, in the operation of the secondary battery, efficient charge control of the secondary battery is achieved by compensating for the charge amount each time the voltage value of the secondary battery reaches the reference voltage value, instead of inefficiently operating the secondary battery by stopping the use of the secondary battery and compensating for the charge amount when the secondary battery is fully discharged. Further, the state of charge of the secondary battery may be maintained to an optimum state according to the characteristics of the power generation system, and a degradation rate of the secondary battery may be slowed down.

Meanwhile, in the description of the present disclosure, it should be understood that each element or component of the control apparatus 200 shown in FIG. 5 is distinguished logically rather than physically.

That is, each element or component corresponds to a logic element or component to realize the technical spirit of the present disclosure, and accordingly, it should be understood that even though each element or component is integrated or separated, it falls within the scope of the present disclosure if a function performed by a logic element or component of the present disclosure can be implemented, and it falls within the scope of the present disclosure regardless of whether names are identical or not if it is an element or component performing an identical or similar function.

Also, in the description of the embodiments of the present disclosure, although the embodiment shows that only one dependent configuration is added for the convenience of understanding, an embodiment in which a combination of at least two dependent configurations is added may be contemplated. Accordingly, the scope of the disclosure is not limited by the illustrated embodiment.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An apparatus for controlling charge and discharge of a secondary battery, the apparatus comprising:
   a sensing unit to measure a voltage of the secondary battery, measure a current of the secondary battery during charging or discharging of the secondary battery and output a voltage value and a current value corresponding to the measured voltage and current, respectively, the secondary battery being included in a power storage unit operable to store a certain amount of power generated by a power generation unit including a generator configured to generate power by new renewal energy, or to discharge stored power; and
   a power control unit configured to:
      output a charge control signal to store the certain amount of power generated by the power generation unit in the power storage unit and supply residual power to a power grid, or a discharge control signal to discharge the power stored in the power storage unit and supply the same to the power grid together with the power generated by the power generation unit,
      measure a state of charge (SOC) of the secondary battery using the voltage value and the current value of the secondary battery measured by, and received from, the sensing unit,
      calculate an amount of discharging power of the secondary battery using the voltage value or the current value measured by the sensing unit during the discharging of the secondary battery, and
      when the voltage value of the secondary battery is less than a preset reference voltage value, output a compensation charge control signal that is different from the charge control signal and the discharge control signal and that is for controlling a charge amount of the secondary battery in consideration of the SOC of the secondary battery, to charge the secondary battery with an amount of charging power obtained by adding, to the calculated amount of discharged power, an amount of power compensation which is based on a preset ratio to a calculated expected power generation amount,
   wherein the preset ratio for calculating the amount of power compensation increases with an increasing number of charge/discharge cycles of the secondary battery due to an increased energy loss of the secondary battery from an increased internal resistance of the secondary battery.

2. The apparatus for controlling charge and discharge of the secondary battery according to claim 1, wherein the power generation unit generates power by at least one power generation method selected from sunlight power generation, solar heat power generation, wind power generation, geothermal heat power generation, hydroelectric power generation, tidal power generation, wave power generation, and power generation by ocean temperature difference.

3. The apparatus for controlling charge and discharge of the secondary battery according to claim 1, further comprising:
   a rotations per minute (RPM) measuring device to measure a rotation rate of the generator included in the power generation unit and output a generator rotation rate value,
   wherein the power control unit determines the amount of power compensation based on an expected power generation amount of the power generation unit calculated using the generator rotation rate value.

4. The apparatus for controlling charge and discharge of the secondary battery according to claim 3, wherein the amount of power compensation is preset based on the calculated expected power generation amount.

5. The apparatus for controlling charge and discharge of the secondary battery according to claim 1, further comprising:
   a power measuring device to measure an amount of power generated by the power generation unit and output a power generation amount value,
   wherein the power control unit determines the amount of power compensation based on the power generation amount value.

6. The apparatus for controlling charge and discharge of the secondary battery according to claim 5, wherein the amount of power compensation is preset based on the power generation amount value.

7. The apparatus for controlling charge and discharge of the secondary battery according to claim 1, wherein the amount of power compensation is preset based on the calculated amount of discharging power.

8. The apparatus for controlling charge and discharge of the secondary battery according to claim 1, further comprising:
   a memory unit to store the reference voltage value.

9. A new renewable energy generation system comprising:
   the apparatus for controlling charge and discharge of the secondary battery defined in claim 1,
   the power generation unit including the generator configured to generate power by new renewal energy; and
   the power storage unit to store power generated by the power generation unit or discharge stored power.

10. The new renewable energy generation system according to claim 9, further comprising:
    a power conversion unit to convert the power generated by the power generation unit or the power outputted from the power storage unit to a required voltage value, a required current value, a required frequency, or a required waveform.

11. A method of controlling charge and discharge of a secondary battery for quality stabilization of power in the supply of power generated by new renewal energy to a power grid, the secondary battery being included in a power storage unit operable to store a certain amount of power generated by a power generation unit or discharge stored power, the method comprising:
    measuring, by a sensing unit, a voltage of the secondary battery;
    measuring, by the sensing unit, a current of the secondary battery during charging or discharging of the secondary battery;

outputting, by the sensing unit, a voltage value and a current value corresponding to the measured voltage and current, respectively;

outputting, by a power control unit, a charge control signal to store the certain amount of power generated by the power generation unit in the power storage unit and supply residual power to a power grid, or a discharge control signal to discharge the power stored in the power storage unit and supply the same to the power grid together with the power generated by the power generation unit, measuring, by the power control unit, a state of charge (SOC) of the secondary battery using the voltage value and the current value of the secondary battery measured by, and received from, the sensing unit;

calculating, by the power control unit, an amount of discharging power of the secondary battery using the voltage value or the current value measured by the sensing unit during the discharging of the secondary battery; and outputting, by the power control unit, a compensation charge control signal that is different from the charge control signal and the discharge control signal and that is for controlling a charge amount of the secondary battery in consideration of the SOC of the secondary battery, to charge the secondary battery with an amount of charging power obtained by adding, to the calculated amount of discharged power, an amount of power compensation which is based on a preset ratio to a calculated expected power generation amount, when the received voltage value of the secondary battery is less than a preset reference voltage value, wherein the preset ratio for calculating the amount of power compensation increases with an increasing number of charge/discharge cycles of the secondary battery due to an increased energy loss of the secondary battery from an increased internal resistance of the secondary battery.

* * * * *